Nov. 5, 1946.  R. M. KNIGHT  2,410,507
TRACK FOR TRACK LAYING VEHICLES
Filed April 14, 1944  3 Sheets-Sheet 1
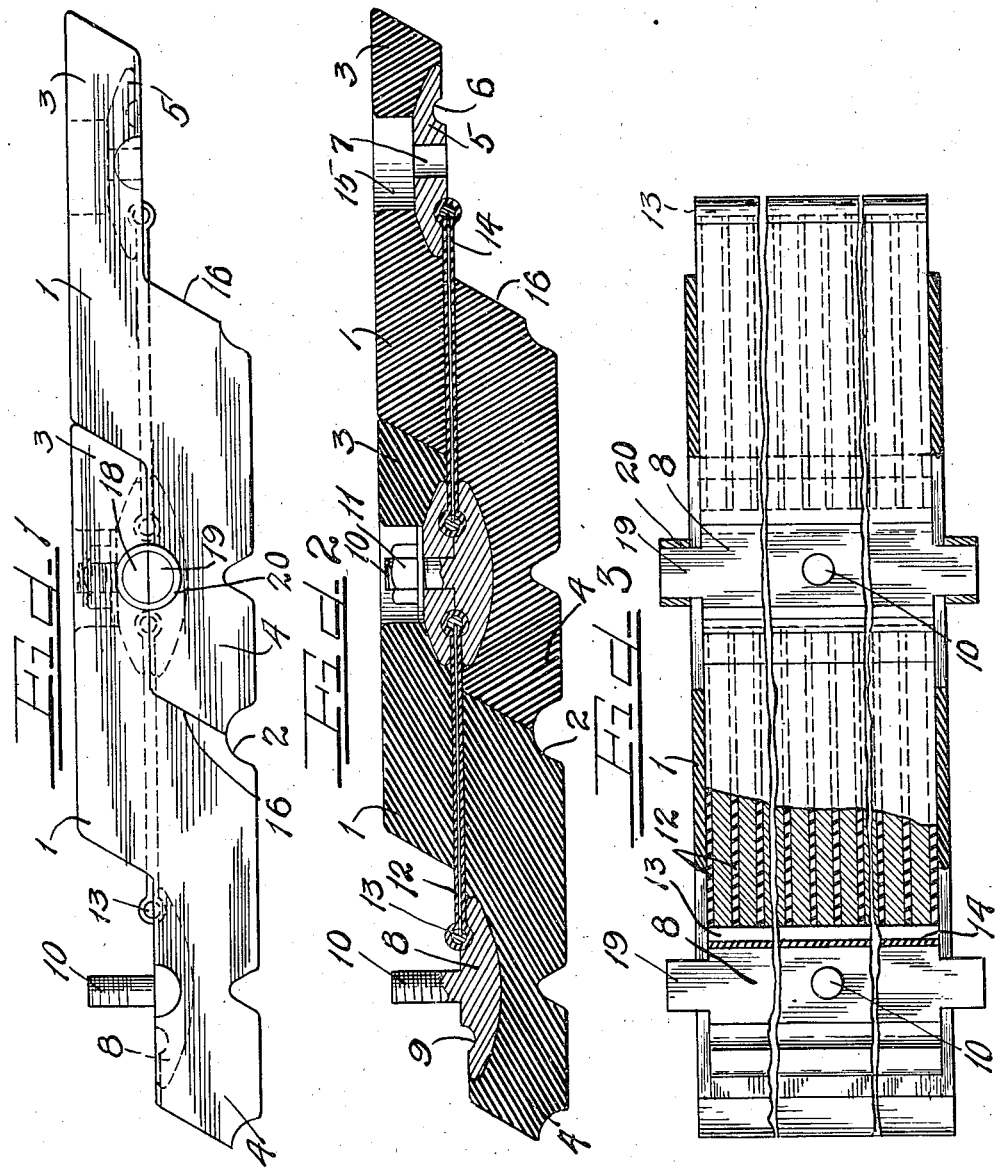
Inventor
Robert M. Knight
by Charles H. Sills Atty.

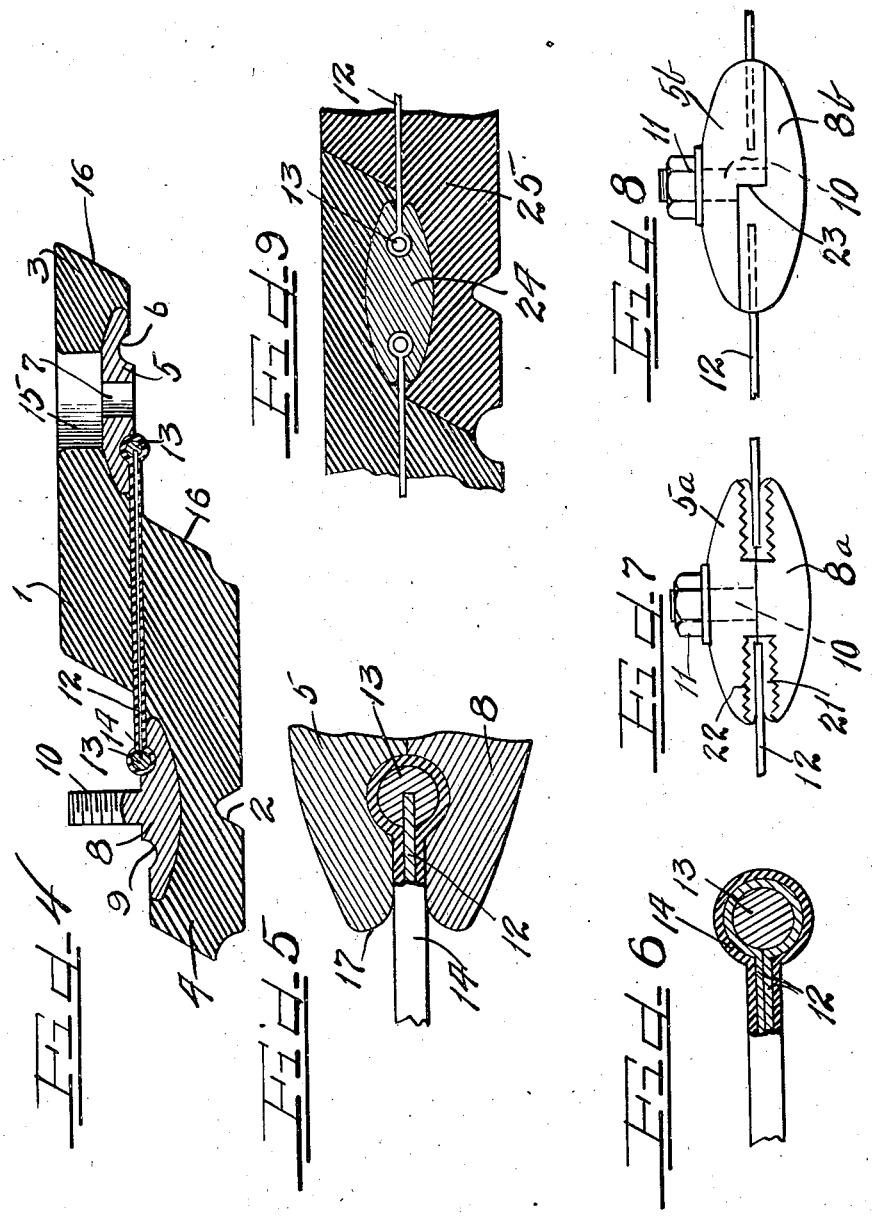

Nov. 5, 1946. R. M. KNIGHT 2,410,507
TRACK FOR TRACK LAYING VEHICLES
Filed April 14, 1944 3 Sheets-Sheet 3
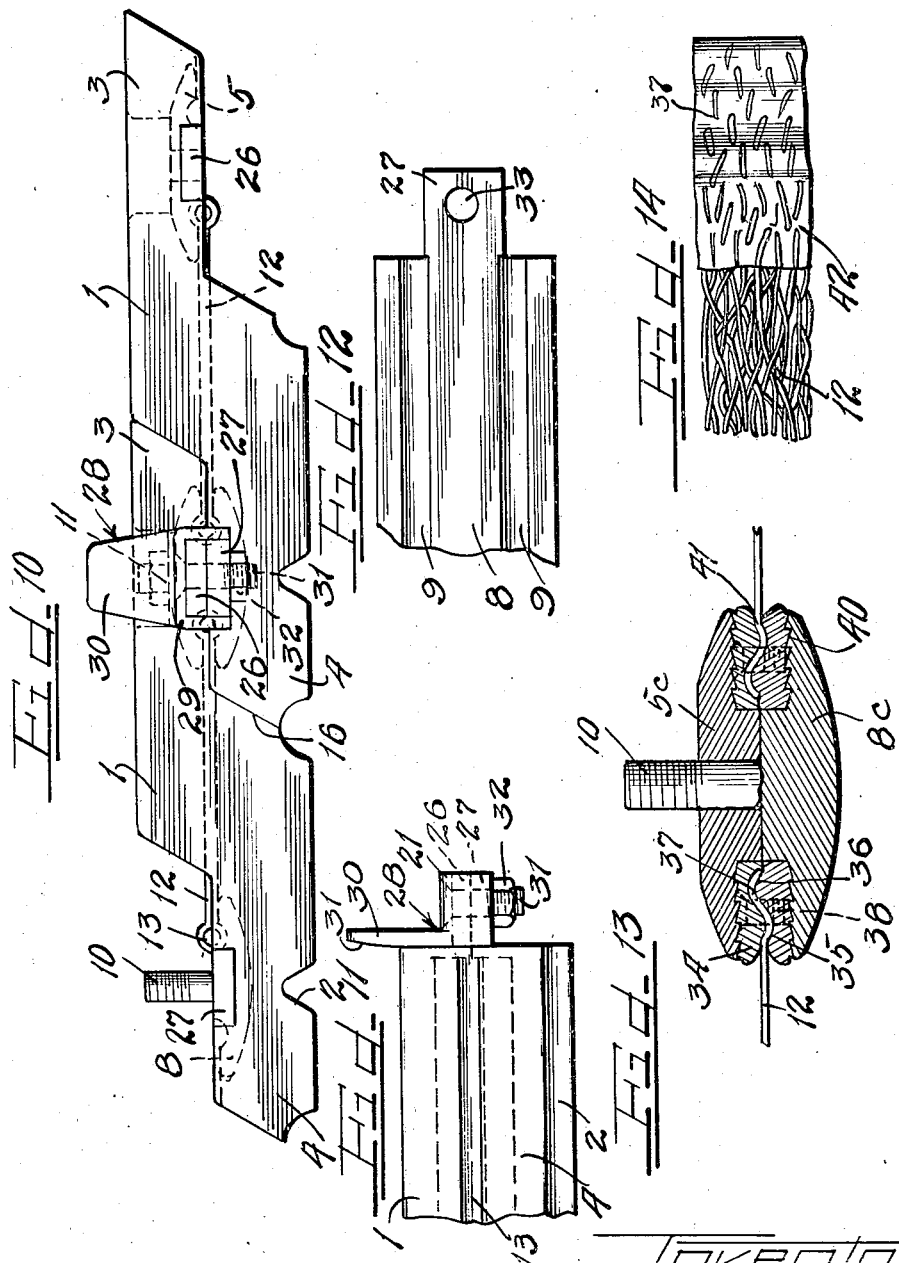

Patented Nov. 5, 1946

2,410,507

UNITED STATES PATENT OFFICE 2,410,507

TRACK FOR TRACK LAYING VEHICLES

Robert M. Knight, Chicago, Ill.

Application April 14, 1944, Serial No. 530,994

34 Claims. (Cl. 305—10)

1

This invention relates to improvements in tracks for track laying vehicles, and more particularly to crawler tracks highly desirable for use in connection with tractors, half-tracks, tanks, trailers, trucks, and substantially any type of vehicle either self-propelled or towed for travel over highways or unpaved terrain, although the invention may have other uses and purposes as will be apparent to one skilled in the art.

This application is a continuation-in-part of and supplants my co-pending application entitled "Track for track laying vehicles," filed October 13, 1941, Serial No. 414,805.

In the past, many and various types of crawler tracks have been developed. In nearly every instance, these formerly known tracks were objectionable in that they were not satisfactory in operation or could not be commercially produced by virtue of prohibitive cost or for other reasons. Insofar as I am aware, only two types of commercially practical crawler tracks have been developed. One of these types is the articulated steel track used on Army tanks and similar equipment. The other type is the endless, meaning inarticulated, single piece reinforced rubber track.

While articulated steel tracks may be satisfactory for military equipment, they are open to a multitude of objections for civilian usage. For example, steel tracks are heavy and clumsy thus necessitating relatively slow speed, they are objectionably noisy, they offer no cushion to the equipment on which they are used thus causing excessive vibration, and are very destructive to paved or hard surfaced highways to such an extent that their use upon highways is forbidden by law, and by virtue of their relatively little flexibility an objectionable amount of power is required to operate them. Further, they are difficult of repair when injured.

Inarticulated rubber tracks, even though so interiorly reinforced as to take the tension load off the rubber cover, are objectionable in the extreme cost of production since the entire track must be handled in production routine as a single unit. Such tracks are likewise expensive in upkeep by reason of the fact that if a rupture occurs in any one portion of the track, the entire track must be replaced, repair of an inarticulated rubber track not as yet being practical.

Rubber tracks of sectional construction, which have been commercially attempted in several instances, are not as flexible as is desired and are subject to the generation of an undesirable or injurious amount of heat resulting from internal

2 friction thus depreciating the track and shortening its life.

Articulated steel tracks have certain advantages over inarticulated rubber tracks, and vice versa. Articulated steel tracks may be repaired by the removal and replacement of shoes or sections and an injury to one portion of the track does not result in the necessity of replacing the entire track. Inarticulated rubber tracks have the advantage of cushioning a load, being less injurious to highways, permitting more flexibility, requiring the use of less power in operation, and being better able to withstand abrasive wear.

The instant invention seeks the provision of a crawler track embodying all of the advantages of the articulated steel track and the inarticulated rubber track with the elimination of their disadvantages. That is an important object of this invention.

Another important object of this invention is the provision of an economical, durable, and highly flexble articulated crawler track comprising separable shoes or sections of reinforced rubber or equivalent material.

A further object is the provision of an articulated crawler track comprising separable shoes or sections, and designed for high speed operation either on paved highways or over unpaved terrain.

It is also a feature of this invention to provide an articulated reinforced rubber crawler track in which tension members extend through each shoe, and are directly connected to transverse reinforcing members of the same shoe as well as adjacent shoes.

A further feature of the invention resides in the provision of an articulated reinforced rubber crawler track, comprising individually separable shoes so constructed that when the shoes are assembled there is continuous metal reinforcing inside the rubber covering of the track extending in a straight line throughout the length of the track parallel with the axis of the track so that the tension load of the track is carried by such metal reinforcing under a straight line pull and such tension load is entirely removed from the rubber covering.

Also an object of the invention resides in the provision of an articulated crawler track embodying separable shoes or sections and in which adjacent shoes are joined together through overlapping portions thereof.

Another object of the invention resides in the provision of an articulated crawler track in which each individual shoe or section carries means by which it is connected to the next adjacent shoe.

Still another feature of the invention resides in the provision of an articulated reinforced rubber crawler track so arranged as to provide metal-to-metal contact between adjacent shoes, the metal being rubber covered except for openings to permit access to the connecting means.

It is also an object of this invention to provide an articulated reinforced rubber crawler track in which tension members extend through each individual shoe, and the shoes are so constructed that the holding means for the tension members are clamped between overlapping parts of adjacent shoes.

A further object of the invention resides in the provision of an articulated reinforced rubber crawler track embodying shoes having transverse reinforcing members therein, the arrangement being such that the transverse reinforcing members of adjacent shoes have complemental portions extending beyond the rubber covering at the sides of the track to provide a base for bogey wheel guides, or sprocket wheel contacting elements.

Still a further object of the invention is to provide an articulated crawler track formed of shoes or sections, in which the ends of the shoes fit together in such a manner as to minimize the openings therebetween when the track is flexed around a sprocket wheel or the like, permitting sufficient separation between adjacent shoes in such case to provide some ventilation to assist in cooling the track, but effectively prohibiting such separation when the track is in contact with the ground so as to prevent the entrance of dirt or other foreign material between the shoes or sections of the track.

While some of the more salient features, characteristics, and advantages of the instant invention have above been pointed out, others will become apparent from the following disclosures, taken in conjunction with the accompanying drawings, in which:

Figure 1 is a fragmentary side elevational view, showing a portion of an articulated crawler track embodying principles of the instant invention;

Figure 2 is substantially a central vertical sectional view, with parts shown in elevation, of the structure of Figure 1;

Figure 3 is a fragmentary plan sectional view taken through substantially the mid portion of the structure of Figures 1 and 2;

Figure 4 is a substantially central vertical sectional view through a single track shoe of the character shown in Figures 1 and 2;

Figure 5 is a fragmentary enlarged vertical sectional view, this figure being an enlargement of the left central portion of Figure 2 with parts omitted;

Figure 6 is a fragmentary partial section of the same character as Figure 5, but illustrating another way of connecting the tension elements to the tension holding members;

Figure 7 is a somewhat diagrammatic view, illustrating a different method of connecting the tension members to holding means therefor;

Figure 8 is also a diagrammatic view of similar character to Figure 7, but illustrating a manner of connecting the tension members directly to the transverse reinforcing members;

Figure 9 is a fragmentary vertical sectional view, with parts shown in elevation, illustrating a still different way of connecting the tension members to the transverse reinforcing means;

Figure 10 is a fragmentary side elevational view of a crawler track of slightly different construction than the showing in Figure 1, but also embodying principles of the instant invention;

Figure 11 is a fragmentary end elevational view of the structure in Figure 10;

Figure 12 is a fragmentary top plan view of one of the reinforcing elements used in the structure of Figure 10;

Figure 13 is a fragmentary vertical sectional view, with the tread rubber omitted, illustrating a somewhat different form of tension holding means and transverse reinforcing elements; and Figure 14 is a fragmentary plan view of a preferred form of tension member.

As shown on the drawings:

In the illustrated embodiments of the present invention only a small portion, namely, two shoes or sections, of an articulated crawler track are shown. It will, however, be understood that the entire articulated crawler track is built up in similar manner to form a complete track loop of desired size. The completely assembled track in general embodies a metallic skeleton having continuity throughout the track in a line paralleling the longitudinal axis of the track, so that this skeleton is enabled to carry the full tension load placed upon the track during use. When the track is assembled, the skeleton is completely encased in tread rubber or equivalent substance, except for portions of the skeleton projecting at the sides of the track to accommodate bogey wheel guides or sprocket engaging members, and except for suitable openings providing access to the connecting means for joining adjacent track shoes. With this arrangement, no tension load is placed upon the rubber covering of the track, such rubber covering being subjected only to a compression load.

Hereinafter, the skeleton of each shoe or section of the track will be referred to as a metallic skeleton, and it preferably is so. However, it will be appreciated that in the case of a relatively light crawler track of a type for use upon motorcycles, scooters, or vehicles of equivalent lightness and small size, fabric cords or ropes might be used as tension members in the skeleton.

With reference to that embodiment of the invention illustrated in Figures 1 to 5, inclusive, and with a special reference to the showing in Figure 4, it will be seen that each individual shoe comprises a body portion 1 in the form of a block of tread rubber or equivalent material. The top face of the tread rubber is preferably smooth for association with bogey wheels or equivalent guiding means, while the under face may be grooved as indicated at 2 or otherwise formed to provide a traction surface. In the central region thereof, the shoe is of full thickness, but the end portions are of reduced thickness and extend outwardly from the central portion. These end portions are offset to provide an upper end portion 3 and a lower end portion 4. Thus when the shoe is connected with adjacent shoes in the assembling of the track, the end portion 3 will overlap the end portion 4 of an adjacent shoe, and the end portion 4 will underlie the end portion 3 of another adjacent shoe. There will, therefore, be an overlapping association between shoes at each end of each shoe. As will later more fully appear, adjacent shoes are connected together directly through the overlapping portions.

The skeleton of a shoe is made up of a pair of rigid transverse reinforcing members, one such member extending across the shoe in each reduced end portion 3 and 4 thereof. Between these transverse members flexible tension means extend longitudinally through the shoe and are connected with the transverse members.

With reference to Figure 4, it will be seen that the transverse member 5 in the reduced end portion 3 of the shoe is in the form of a bar or plate having a substantially flat under surface with the exception of a pair of spaced grooves 6 within which portions of tension means are seated. This reinforcing member 5 is provided with one or more apertures 7 therethrough to accommodate connecting means carried by the complemental end portion of an adjacent shoe.

A transverse member 8 is carried in the reduced end portion 4 of the shoe, this member being similar in style to the transverse member 5, but reversed in position. The member 8 also has a pair of grooves 9 therein for receiving portions of the tension means. This member 8 further includes one or more preferably integral stud bolts 10, these bolts corresponding in number and position to the apertures 7 in the transverse member 5. When adjacent shoes are joined, the bolts 10 extend upwardly through the apertures 7 in the transverse member 5 of an adjacent shoe, and nuts 11 may be attached to these bolts, as seen in Figure 2, in order to join the shoes together.

The tensioning means extending through the shoe from one transverse member to the other are preferably a series of elements disposed side by side transversely of the track. These tension means may be formed of cables, wire mesh, sheet steel, braided wire tape, chain sections, or other suitable material. It is, however, preferable to have these tensioning means substantially flat in character so that during operation of the track they will not develop heat by virtue of internal friction. Likewise, the tensioning means should be of such character as to afford a suitable bond with the tread rubber, in the event the tension means are not precoated with a rubber or rubber compound prior to the time the tread rubber is vulcanized to them. My preferred form of tension element is a substantially flat strip or tape 12 of wire braid, an enlarged showing of which may be seen in Figure 14. With reference now to Figure 3 it will be seen that a number of these tension elements 12 are disposed side by side transversely of a shoe. The tapes are held at each end of the shoe by transverse rods 13 extending the width of the body portion of the shoe. These rods may be grooved, as seen more clearly in Figure 5, and the tape ends inserted in the grooves, wherein they may be held by virtue of welding, brazing, or any equivalent operation. If so desired, the transverse rods 13 and the tension members 12 held thereby may be taken as a unit and initially precoated with a relatively light coating of rubber or rubber compound as an aid in vulcanizing the tread rubber to the tension members. However, such operation is not necessary, because the tread rubber may be vulcanized directly to the metallic skeleton satisfactorily without the aid of any precoating. Such precoating is illustrated in the drawings, and designated by the reference character 14 in Figures 1 to 6, inclusive.

In fabricating a shoe, the tension means are associated with the transverse reinforcing members 5 and 8 by inserting the rods 13 in the inner grooves of these transverse members. With the skeleton assembly held in position, the tread rubber is then vulcanized to and around the fabricated skeleton. In so vulcanizing the tread rubber it will be noted that the inside faces of the transverse members are left exposed for positive metal-to-metal engagement with the complemental transverse members on adjacent shoes, but the outside portions of these members are entirely covered with rubber with the exception of suitable apertures 15 to provide access to the bolts 11 securing adjacent shoes together. It will also be noted that all end portions of tread rubber are terminated obliquely as indicated at 16 so that there will not be a vertical line of division between the rubber of adjacent shoes. This arrangement limits the separation between adjacent shoes during use of the track. With the oblique arrangement, especially as seen in Figure 1, between adjoining shoes, when the track is in contact with the road the compression will maintain the joint at 16 entirely closed to prevent the admission of dirt or other foreign matter between the treads of adjacent shoes. However, when the track turns around a sprocket wheel or equivalent drive element, there will be a partial opening between the confronting ends 16 to permit some ventilation of the track as a cooling medium, and there is little likelihood of the entrance of dirt into such an opening because at that time the track is not in contact with the ground surface.

Of course, when the track passes around a sprocket wheel or other drive element, there is a flexing of the intermediate portions of the shoes between the transverse members 5 and 8, and a consequent bending or flexing of the tension elements 12. In order to prevent undue wear of the tension elements in the region of the transverse members, the sides of the transverse members are curved inwardly as indicated at 17 in Figure 5, thus providing a flared space between these members permitting free movement of the tension elements 12 and eliminating any movement of these tension elements against a sharp corner. The spaces provided by the flared ends 17, as is apparent from the showing in Figure 2, are filled with tread rubber which also affords a cushion between the tension elements and the reinforcing members. This prolongs the life of the tension elements.

As a means for driving the track by a sprocket wheel or similar arrangement, the transverse reinforcing members 5 and 8 may be provided with integral extensions 18 and 19 respectively which project beyond the tread rubber at each side of the shoe or track. These extensions are preferably in the nature of half rounds, and as seen best in Figure 1, two superposed elements 18 and 19 form substantially a circular extension. Around the portions 18 and 19, a bearing ring 20 may be provided to act as a sprocket wheel engaging element. This sleeve or bearing ring 20 may be held in place solely by friction, or may, if desired, be sweated onto the projections 18 and 19.

In assembling the individual shoes into a complete track, it is a simple expedient to overlap adjacent ends of shoes and secure them together by means of the stud bolts 10 and nuts 11. After they are so secured, the sleeves or bearing rings 20 may be placed over the projecting portions 18 and 19 of the transverse reinforcing members. It will be especially noted that when a pair of adjacent shoes are assembled, the remaining groove 9 in the transverse member of one shoe receives therein a transverse rod 13 of the other shoe, and vice versa. Thus, the tension elements of one shoe are connected to the tension elements of another shoe through the transverse reinforcing members 5 and 8, and the tension element holding means or rods 13 are clamped between the transverse reinforcing members of adjacent shoes when the nuts 11 are tightened down. With this arrangement there is a definite metal-to-metal continuity throughout the length of the entire track in a direction paralleling the longitudinal axis of the track. The entire metallic skeleton is covered by tread rubber with the exception of openings to permit access to the nuts 11 and with the exception of the projections 18 and 19 extending laterally beyond the tread rubber. If any individual shoe is injured, it is a simple expedient to knock off the bearing rings 20, release bolts 11, and remove and replace that shoe. It will further be noted that between the joined transverse reinforcing members, the track is highly flexible so that it will bend easily in passing around sprocket wheels or other drive members. Thus, it can be seen that the track possesses the advantages of being entirely rubber-covered, having extreme flexibility, economy in manufacture and use, and any portion of the track may be readily repaired when needed.

In Figure 6 I have illustrated another manner of connecting a tension element 12 to the transverse rod 13. In this instance, the tension element is looped around the rod, and the free end of the element after looping may be attached to the body portion of the element in any suitable manner. If so desired, the tape may be used in a continuous manner so that between the rods 13, the tape will extend in double thickness, one layer on top of the other.

In Figure 7 I have indicated diagrammatically another way of attaching the tension elements 12 to the transverse reinforcing members. In this instance, the tape ends are disposed in a groove in a substantially flat bar 21 in the same manner above described in connection with the showing in Figure 5. These flat bars 21 are preferably provided with serrated upper and lower faces as indicated at 22. The transverse reinforcing members are identical in construction with those above described with the exception that they have openings of sufficient size to accommodate the bars 21 and the inside faces of these openings are serrated complementally to the serrations on the bars. For purposes of convenience, these transverse members are designated 5a and 8a in Figure 7. It will be noted that the ends of the members 5a and 8a as well as the end portions of the bars 21 are curvate to provide a flaring opening permitting free and easy bending of the tension members 12.

In Figure 8 I have shown a still different form of skeleton assembly wherein the tension members 12 are connected directly to the transverse reinforcing members 5b and 8b. The transverse members are offset on their interior faces as indicated at 23, and the tension members extend into grooves in each of the transverse members wherein they are held by brazing, welding, or some equivalent operation. The offsetting of the transverse members maintains the tension members from adjacent shoes in direct alignment so that the pull load upon the track is always taken up by the skeleton in one direction.

In Figure 9, I have shown a construction desirable for a track having relatively long sections rather than relatively short individual shoes. In this instance, a transverse reinforcing member 24 is utilized which is preferably a single solid piece of metal. The member is provided with key hole openings along each side, such openings comprising an elongated slot extending inwardly of the side edge and terminating in a larger aperture. When two sections of track are joined together, the tension members, secured to the rods 13 in any suitable manner, are slid lengthwise into the key hole openings in the side edges of the transverse member 24. Thereafter, tread rubber 25 may be molded and vulcanized over the skeleton assembly thus formed, and the sections may be of substantially any desired length.

In Figures 10, 11 and 12 I have illustrated a somewhat different formation of the projecting ends of the transverse reinforcing members 5 and 8 to accommodate a bogey wheel guide as well as a sprocket wheel engaging portion. In these figures, with the above noted exception, the structure of the shoes is the same as above described in connection with Figures 1 to 5, inclusive. In this instance, however, the members 5 and 8 are provided with projecting portions 26 and 27 respectively each substantially rectangular in form. These portions, of course, project beyond the tread rubber on each side of the track. When adjacent shoes are assembled, the portions 26 and 27 come together in superposed overlapping relationship as seen clearly in Figure 10.

A combination bogey wheel guide and sprocket engaging member generally indicated by numeral 28 is connected to these projections. This member 28 comprises a sleeve portion 29 embracing the projections 26 and 27 over the top and downwardly over the sides, the sleeve portion having an open bottom and the side wings of this sleeve portion preferably terminating flush with the lower surface of the projecting member 27. The sleeve 29 may entirely surround both members 26 and 27 if so desired, but it is preferable to make a three-sided sleeve so as to keep the metallic portion of the track as high above ground surface as possible.

On the inner end of the member 28, the sleeve merges into an upstanding wing 30, preferably having downwardly diverging side walls. The wing is of sufficient height to project beyond the inner face of the tread rubber of the track, and the inner portion of the wing is beveled outwardly as indicated at 31 so as to insure entry of the bogey wheel between oppositely disposed wings on the track. The sleeve portion 29 serves as a bearing surface for contact with the drive sprockets.

The element 28 is readily attached to the projecting portions 26 and 27 by means of a suitable bolt and nut connection 31 and 32, the bolt 31 extending through suitable apertures 33 in the projections.

In Figures 13 and 14 there is shown a still different manner of connecting the tension members 12 with the transverse reinforcing means. This arrangement provides a much easier assembly of the tension members and the means for holding them at the ends. In this instance, a pair of superposed transverse bars 34 and 35 are provided having complemental serrated or tortuous interior surfaces as indicated at 36. These members are brought into superposed relationship with the ends of the tension elements 12 disposed therebetween, the ends of the tension elements being bent in a tortuous manner as indicated at 37 when clamped between the bars 34 and 35. The bars are secured together by a series of stud bolts 38 extending therethrough and therealong. The outer faces of each of the bars 34 and 35 are serrated as indicated at 40 for engagement between transverse reinforcing members 5c and 8c having recesses for receiving a joined pair of bars therein. Confronting faces of the members 5c and 8c are serrated complementally to the bars 34 and 35, and as seen best in Figure 13, these serrations are preferably in the nature of saw teeth so as to afford a better grip upon the bars. As also indicated in Figure 13, the bars 34 and 35 have curvate edges as indicated at 41 to provide a flared opening into which tread rubber will be molded so as to provide a cushioned bending surface for the tension members 12.

With this arrangement, it is preferable that the tension members are not precoated with a thin layer of rubber. In order to augment the gripping action of the bars 34 and 35 upon the ends of the tension members, however, the end portions of each member are preferably wrapped laterally with a binder 42 which may be in the nature of aluminum foil or equivalent material. This material is pressed into the interstices of the braided tension member and insures a firm grip upon the ends of these members by the bars 34 and 35. In assembling the track shoes and in the construction of each individual shoe, the joined bars 34 and 35, are disposed and treated in the same manner as the rods 13 above described.

From the foregoing, it is apparent that I have provided an economical highly flexible crawler track, substantially enclosed by tread rubber or equivalent yielding material, whereby the track is readily adapted for high speed operation, and for the carrying of heavy loads. It will further be noted that the track is articulated with each individual shoe carrying means by which it may be connected to the next adjacent shoe, and with the respective shoes connected directly through overlapping portions. These overlapping portions are further arranged so as to establish a continuity through the entire track between the reinforcing members and the tensioning members capable of carrying the entire tension load on the track, so that the rubber is relieved of all such loads, and it will be apparent that this continuity is in a direction paralleling the axis of the track. The entire skeleton structure of the track as well as the treads is so arranged as to be highly durable, but if any portion of the track should be damaged, it can easily be removed and replaced without destroying the entire track and without involving but a minor cost. Consequently, the entire track is extremely economical both to manufacture and use.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A track for track laying vehicles comprising a plurality of sectional reinforcing units connected together in series and each unit including flexible tension members having transverse rods at their ends, transverse reinforcing plates extending across the track and formed with elongated openings to receive the rods, thereby to connect the tension members of adjacent units, at least one of the reinforcing plates being formed of two pieces detachably connected together and formed with registering grooves to receive and grip the rods, and a covering of rubber over the reinforcing units and plates.

2. A track for track laying vehicles comprising a plurality of sectional reinforcing units connected together in series and each unit including flexible tension members having transverse rods at their ends, transverse reinforcing plates extending across the track and formed with elongated openings to receive the rods, thereby to connect the tension members of adjacent units, and a covering of rubber over the reinforcing units and plates, said transverse plates being formed at their ends with bosses projecting beyond the rubber covering and adapted to cooperate with sprockets to drive the track.

3. In a track for track laying vehicles, a shoe comprising a rubber body having adjacent its ends transverse stiffening members and flexible tension members connecting the transverse members, said flexible tension members comprising a series of flat wire tapes of a thickness less than one-third their widths arranged side by side in a layer, and transverse rods connected to the ends of the tapes, said transverse members being formed with grooves receiving the rods to secure the tapes to the transverse members.

4. In a track for track laying vehicles, a shoe comprising a rubber body having end portions offset vertically and each of substantially half the thickness of the central portion, said end portions being adapted to overlap vertically the complementary end portions of adjacent shoes, a transverse stiffening member carried by each of the end portions, flexible reinforcing means extending through the shoe from one transverse member to the other, transverse rods secured to the ends of the reinforcing means, said transverse members being formed with grooves to receive the rods, thereby to connect the reinforcing means to the transverse members.

5. In a track for laying vehicles, a shoe comprising a rubber body having end portions offset vertically and each of substantially half the thickness of the central portion, said end portions being adapted to overlap the complementary end portions of adjacent shoes, a transverse stiffening member carried by each of the end portions, flexible reinforcing means extending through the shoe from one transverse member to the other, transverse rods secured to the ends of the reinforcing means, said transverse members being formed with open grooves in which the rods lie so that when the transverse members of adjacent shoes are connected together the rods will be gripped therebetween.

6. A shoe for a crawler track, including longitudinally extending tension means, transverse members holding said tension means at each end of the shoe, and tread rubber encasing said tension means and transverse members leaving a part of each transverse member exposed for direct engagement with a complemental member on an adjacent shoe.

7. A shoe for a crawler track, including a tread rubber body, and combination metallic reinforcing and tension means extending entirely through said body in a direction longitudinal of a track made up of a number of said shoes and being partially exposed at the ends of said body for direct connection to similar means in adjacent shoes.

8. A shoe for a crawler track, including a tread rubber body, and metallic reinforcing means extending entirely through said body and being partially exposed at the ends of said body for direct connection to similar means in adjacent shoes, said body being formed with end portions of reduced thickness with said reinforcing means exposed on the inner face of said end portions.

9. A shoe for a crawler track, including a tread rubber body, and metallic reinforcing means extending entirely through said body and being partially exposed at the ends of said body for direct connection to similar means in adjacent shoes, said body being formed with offset end portions of reduced thickness to permit one end portion to overlie a complemental end portion on an adjacent shoe and the other end portion to underlie a complemental end portion on another adjacent shoe.

10. In a track for track laying vehicles, a plurality of individually separable shoes, each shoe including metallic tension members, metallic transverse reinforcing members holding said tension members at each end of the shoe, and tread rubber encasing said tension and reinforcing members leaving a part of the reinforcing members exposed for direct engagement with complemental reinforcing members of adjacent shoes.

11. A shoe for a crawler track, including longitudinally extending tension means, transverse members holding said tension means at each end of the shoe, and tread rubber encasing said tension means and transverse members leaving a part of each transverse member exposed for direct engagement with a complemental member on an adjacent shoe, said tension means being flexible.

12. A shoe for a crawler track, including longitudinally extending tension means, transverse members holding said tension means at each end of the shoe, and tread rubber encasing said tension means and transverse members leaving a part of each transverse member exposed for direct engagement with a complemental member on an adjacent shoe, said tension means comprising substantially flat flexible metallic strips disposed side by side transversely of the shoe.

13. A shoe for a crawler track, including longitudinally extending tension means, transverse members holding said tension means at each end of the shoe, and tread rubber encasing said tension means and transverse members leaving a part of each transverse member exposed for direct engagement with a complemental member on an adjacent shoe, said tension means comprising flexible substantially flat strips of metallic braid disposed side by side transversely of the shoe.

14. A track for track laying vehicles made up of a plurality of individually separable shoes, each of said shoes comprising a tread rubber block, flexible metallic tension means extending through said block, and a transverse reinforcing member embedded in each end portion of said block and holding said tension means, said members being partially exposed for direct connection with complemental members of adjacent shoes to establish a complete metallic continuity throughout the assembled track in a line paralleling the longitudinal axis of the track and capable of carrying the full tension load on the track.

15. An articulated crawler track including a plurality of shoes, each shoe being shaped for vertical overlapping association with an adjacent shoe, and connecting means of a releasable type directly joining the vertical overlapping portions of adjacent shoes.

16. An articulated crawler track including a plurality of separable shoes, each shoe having a portion reduced in thickness for vertical overlapping association with a complemental portion of an adjacent shoe, and connecting means joining adjacent shoes directly through said vertically overlapping portions.

17. An articulated crawler track including a plurality of separable shoes, each shoe having end portions reduced in thickness for vertical overlapping association with complemental portions of adjacent shoes, and rigid connecting means joining adjacent shoes directly through the overlapping portions thereof.

18. An articulated crawler track including a plurality of shoes, each shoe being shaped for overlapping association with an adjacent shoe, and connecting means joining adjacent shoes through the overlapping portions thereof, and each shoe being of flexible construction between its connection points with adjacent shoes.

19. An articulated crawler track including a plurality of separable sections, and means forming a part of each section and shaped for interlocking engagement directly with complemental means on an adjacent section.

20. An articulated crawler track including a plurality of separable sections, and means carried by each section for connecting that section to an adjacent section, each section comprising a metallic skeleton, and tread rubber encasing said skeleton in such manner that the assembled track is exteriorly tread rubber except for openings permitting access to said connecting means.

21. In a crawler track, a skeleton formation including longitudinally extending tension members, transverse reinforcing members holding said tension members, and said transverse reinforcing members having flared side edge portions to permit easy and free flexing of said tension members relatively to said transverse members, and tread rubber enclosing said skeleton formation and embracing said tension members inside the flared edges of the transverse members to cushion the flexing of the tension members.

22. An articulated crawler track comprising a number of individually separable shoes, each shoe including a tread rubber block, a transverse reinforcing member embedded in each end portion of said block, and tension means extending longitudinally through said block and secured directly to said transverse reinforcing members, said block being so shaped as to leave a part of the transverse member exposed at each end of the shoe for direct engagement with a complemental member on an adjacent shoe.

23. An articulated crawler track comprising separable shoes, each shoe including a tread rubber block, a transverse reinforcing member embedded in each end portion of said block, and tension means extending longitudinally through said block and secured directly to said transverse reinforcing members, said transverse reinforcing members being partially exposed for direct connection with complemental members on adjacent shoes.

24. An articulated crawler track comprising separable shoes, each shoe including a rubber body, a metallic reinforcing member embedded in said body and extending transversely of said shoe at each end thereof, tension elements extending longitudinally through said body, means holding the ends of said tension elements and said transverse members having recesses therein for the partial reception of said means, said means being clamped between transverse members of adjacent shoes.

25. An articulated crawler track comprising separable shoes, each shoe including a rubber body, a metallic reinforcing member partially embedded in said body for exposed face to face association with a complemental member on an adjacent shoe, tension means extending through said body and into association with the exposed part of said reinforcing members, said tension means being clamped between reinforcing members of adjacent shoes.

26. An articulated crawler track including separable shoes, each shoe including a rubber body, a transverse reinforcing member at each end of a shoe for face to face connection with a complemental member on an adjacent shoe, tension means extending through said body between said reinforcing members, said reinforcing members having portions extending beyond said body at each side of said track, and a bogey wheel guide secured to the complemental extensions of adjacent shoes.

27. A shoe for an articulated crawler track, including a rubber body, tension members extending through said body, means having serrated surfaces holding the ends of said tension members, and a transverse reinforcing member at each end of the shoe having a face complementally serrated for engaging said means.

28. A shoe for an articulated crawler track, including a rubber body, tension members extending through said body, means having serrated surfaces holding the ends of said tension members, and a transverse reinforcing member at each end of the shoe having a face complementally serrated for engaging said means, said reinforcing members being arranged for connection with complemental members on adjacent shoes with said means clamped between complemental reinforcing members.

29. A shoe for an articulated crawler track, including a rubber body, a transverse reinforcing member at each end of said body, substantially flat tension members extending through said body, and confronting bars having complemental tortuous faces secured together over the ends of said tension members and engaged with said transverse members.

30. A shoe for an articulated crawler track, including a rubber body, a transverse reinforcing member at each end of said body, substantially flat tension members extending through said body, and confronting bars having complemental tortuous faces secured together over the ends of said tension members and engaged with said transverse members, said tension members being in the form of braided wire tapes, and a metal foil around the ends of said tension members to enhance the grip of said bars thereon.

31. An articulated crawler track including a plurality of separable sections, each said section including a flexible skeleton which skeletons when connected together carry the tension load of the track, tread rubber encasing each said skeleton except for an exposed portion at each end of each section, and said exposed parts of each skeleton being shaped for direct interlocking engagement with a complemental part on an adjacent section.

32. In a crawler track, a flexible metallic skeleton capable of carrying the full tension load of the track, said skeleton including rigid transversely extending reinforcing means at spaced intervals, a series of flexible substantially flat tension means each held firmly at the ends by said reinforcing means and extending only from one set of reinforcing means to the next longitudinally of the track, and a tread rubber covering substantially encasing said skeleton, certain portions of said skeleton being free of said covering for engagement by a driving member when the track is in use.

33. A shoe for an articulated crawler track, including a tread rubber body having reduced end portions, rigid metallic reinforcing means embedded in said body at each end thereof and extending transversely thereof, said means being partially exposed at the reduced end portions of said body, the exposed portion of said means at each end of said body being shaped for direct interlocking engagement with a complemental portion of another shoe, and tension means in the form of flat metallic braid embedded in said body and extending longitudinally thereof and connected to said reinforcing means at each end of said body.

34. A shoe for an articulated crawler track, including a tread rubber body having reduced end portions, rigid metallic reinforcing means embedded in said body at each end thereof and extending transversely thereof, said means being partially exposed at the reduced end portions of said body, the exposed portion of said means at each end of said body being shaped for direct interlocking engagement with a complemental portion of another shoe, and tension means in the form of flat metallic braid embedded in said body and extending longitudinally thereof and connected to said reinforcing means at each end of said body, said reinforcing means projecting laterally beyond said body for association with complemental means on another shoe to jointly support bogey wheel guiding means.

ROBERT M. KNIGHT.